United States Patent [19]

Yang et al.

[11] Patent Number: 5,840,088
[45] Date of Patent: Nov. 24, 1998

[54] ROTOGRAVURE PROCESS FOR PRODUCTION OF PATTERNED ABRASIVE SURFACES

[75] Inventors: Wenliang Patrick Yang, Ballston Lake; Gwo Shin Swei, East Amherst; Kevin Bruce Allen, Latham; Paul Wei, Amherst, all of N.Y.

[73] Assignee: Norton Company, Worcester, Mass.

[21] Appl. No.: 780,750

[22] Filed: Jan. 8, 1997

[51] Int. Cl.$^6$ .............................. B24D 3/34; B24D 11/00
[52] U.S. Cl. ............................................. 51/295; 51/293
[58] Field of Search ............................. 51/293, 295, 307

[56] References Cited

U.S. PATENT DOCUMENTS

| | | | |
|---|---|---|---|
| 3,991,527 | 11/1976 | Maran | 451/529 |
| 4,644,703 | 2/1987 | Kaczmarek et al. | 51/298 |
| 4,773,920 | 9/1988 | Chasman et al. | 51/295 |
| 5,014,468 | 5/1991 | Ravipati et al. | 51/295 |
| 5,107,626 | 4/1992 | Mucci | 51/307 |
| 5,152,917 | 10/1992 | Pieper et al. | 51/295 |
| 5,304,223 | 4/1994 | Pieper et al. | 51/293 |
| 5,378,251 | 1/1995 | Culler et al. | 51/295 |
| 5,437,754 | 8/1995 | Calhoun | 51/293 |

*Primary Examiner*—Deborah Jones
*Attorney, Agent, or Firm*—David Bennett

[57] ABSTRACT

Coated abrasives suitable for very fine abrading applications can be obtained by depositing formulations comprising abrasive grits, fillers, grinding aid, additives and a binder resin and in patterns on a surface using a rotogravure technique providing the viscosity is controlled such that the formulation deposited does not lose its shape prior to cure.

21 Claims, 2 Drawing Sheets

ROTOGRAVURE PROCESS FOR PRODUCTION OF PATTERNED ABRASIVE SURFACES

BACKGROUND OF THE INVENTION

This invention relates to the production of patterned abrasive surfaces on substrates in a form useful for fine finishing of substrates such as metals, wood, plastics and glass using a rotogravure process. The proposal to deposit isolated structures such as islands of a mixture of a binder and abrasive material on a backing material has been known for many years. If the islands have very similar heights above the backing and are adequately separated then, (perhaps after a minor dressing operation), use of the product will result in reduced surface scratching and improved surface smoothness. In addition the spaces between the islands provide a route by which swarf generated by the abrasion can be dispersed from the work area.

In a conventional coated abrasive, investigation of the grinding surface reveals that a comparatively small number of the surface abrasive grits in an active abrading zone are in contact with the workpiece at the same time. As the surface wears, this number increases but equally the utility of some of those abrasive grits may be reduced by dulling. The use of abrasive surfaces comprising a uniform array of isolated islands has the advantage that the uniform islands wear at essentially the same rate such that a uniform rate of abrasion can be maintained for longer periods. In a sense the abrading work is more evenly shared among a larger number of grinding points. Moreover since the islands comprise many smaller particles of abrasive, erosion of an island uncovers new, unused abrasive particles which are as yet undulled.

One technique for forming such an array of isolated islands or dots that has been described is that of the rotogravure printing. The technique of rotogravure printing employs a roll into the surface of which a pattern of cells has been engraved. The cells are filled with the formulation and the roll is pressed against a surface and the formulation in the cells is transferred to the surface. Normally the formulation would then flow until there was no separation between the formulations deposited from any individual cell. Ultimately a layer of essentially uniform thickness would be obtained. By way of illustration, comparative examples C and D of U.S. Pat. No. 5,152,917 describe a process in which the pattern obtained by a rotogravure process quickly lost all separation of the individual amounts deposited from the cells.

In U.S. Pat. No. 5,014,468 a binder/abrasive formulation was deposited from rotogravure cells on a roller in such a way that the formulation was laid down in a series of structures surrounding an area devoid of abrasive. This is believed to be the result of depositing less than the full volume of the cell and only from the perimeter of each cell, which would leave the ring formations described.

The problem with the rotogravure approach has therefore always been the retention of a useful shape to the island. To formulate an abrasive/binder mixture that is sufficiently flowable to be deposited and yet sufficiently non-flowable such that it does not slump to an essentially uniform layer coating when deposited on a substrate has proved very difficult.

Chasman et al., in U.S. Pat. No. 4,773,920 disclosed that using a rotogravure coater it is possible to apply a uniform pattern of ridges and valleys to the binder composition which, when cured, can serve as channels for the removal of lubricant and swarf. However beyond the bare statement of possibility, no details are given that might teach how this might be carried out.

In U.S. Pat. No. 4,644,703 Kaczmarek et al. used a rotogravure roll in a more conventional fashion to deposit an abrasive/binder formulation to deposit a layer that is then smoothed out before a second layer is deposited by a rotogravure process on top of the smoothed-out first layer. There is no teaching of the nature of the final cured surface.

In U.S. Pat. No. 5,014,468 (Ravipati et al.) it was proposed to use an abrasive/binder mixture having non-Newtonian shear-thickening flow properties and to deposit this mixture by a rotogravure technique on to a film. In this process the mixture was deposited from the edges of the rotogravure cells to produce a unique structures with deposits of reducing thickness with distance away from the surface surrounding areas devoid of the mixture. If the cells are sufficiently close together, the surface structures can appear interlinked. This product has proved very useful, particularly in ophthalmic fining operations. The process is very useful but it has a potential problem with increasing build-up of material in the cells of the rotogravure roll such that the deposition pattern can change slightly during a protracted production run. In addition the nature of the process is such that it is limited to formulations containing relatively fine abrasive grits, (usually less than 20 microns).

Another approach has been to deposit the abrasive/binder mixture on a substrate surface and then impose a pattern comprising an array of isolated islands on the mixture by curing the binder while in contact with a mold having the inverse of the desired patterned surface. This approach is described in U.S. Pat. Nos. 5,437,754; 5,378,251; 5,304,223 and 5,152,917. There are several variations on this theme but all have the common feature that each island in the pattern is set by curing the binder in contact with a molding surface. This approach too is not without its problems in that incomplete pull-out from the mold often occurs such that, instead of producing, for example pyramids, volcano shapes complete with crater, frequently result.

The present invention presents a technique for producing uniformly patterned shapes of an abrasive/binder combination that does not require a cure-in-mold operation or the selection of a binder/abrasive combination with specific non-Newtonian shear-thickening flow characteristics.

The present invention therefore provides a flexible and effective route for the commercial scale production of coated abrasives with a uniform array of isolated abrasive composite shapes. Such coated abrasives are well adapted to the treatment of a wide range of substrates to yield fine finishes for protracted periods of operation at a substantially uniform cut rate.

GENERAL DESCRIPTION OF THE INVENTION

The problem encountered in the use of rotogravure techniques to produce patterned coated abrasive materials has always been the retention of a useful shape and pattern after the deposition of the formulation. Most frequently the deposited shape loses its vertical dimensions and tends to run across the surface and join up with adjacent shapes. This problem is referred to in comparative examples C and D of U.S. Pat. No. 5,152,917 which was discussed above. In U.S. Pat. No. 5,014,468 the solution adopted therein was to use a formulation with a shear-thickening rheology which caused the mixture to be deposited from the edges of the rotogravure cells to form the unique pattern described therein.

It has now been found that if the low-shear viscosity and the high-shear viscosity are properly controlled, it is possible to produce, using a rotogravure technique, patterned coated abrasives with various distinct patterns including discrete dots, connected dots, lines and other patterns even when the formulation has a shear-thinning rheology. The key is to formulate the binder/abrasive mixture to fulfill two conditions. The first condition is that the viscosity is relatively low under relatively high shear conditions (such as are experienced when filling the gravure cells, doctoring the gravure roll lands after filling of the cells, and while transferring the material to a substrate at the nip between the rotogravure roll and a rubber roll). In other words the formulation should have a low high-shear viscosity to facilitate coating deposition on to the substrate. The second condition is that the formulation has a high low-shear viscosity to prevent excessive flow and leveling when the formulation is sitting on the substrate under low-shear conditions before it is cured. It is also highly desirable that the viscosity recovery time is short by comparison with the time between coating deposition and cure.

Theoretical studies of the pattern retention of deposits indicate that surface tension is the driving force leading to flow (and hence loss of the pattern), and viscosity is the resisting force. Thus retention of the pattern will be favored by low surface tension and high viscosity.

However with radiation-curable binders such as are commonly used with the abrasive/binder formulations with which this invention is primarily concerned, the surface tension does not vary much and is generally in the range of about 30–40 dynes/cm. A properly formulated water-based abrasive/binder mixture is also generally has a surface tension in the same range. Thus the viscosity is the most result-affecting parameter which can be adjusted.

The present invention therefore comprises a process for the production of a coated abrasive comprising a pattern of abrasive/binder composites adhered to a backing material said process comprising:

(a) applying by a rotogravure technique, a layer of a formulation comprising abrasive grits, (and optionally grinding aid, fillers, and additives), and a curable resin binder in a pattern of isolated structures, said formulation having a viscosity at a high shear rate of $10^3$ sec$^{-1}$ of from 10,000 to 1,000 cp.;

(b) after deposition of the formulation on the backing material, increasing the viscosity of at least the surface layers of the deposited formulation to be above 4,000 cp. at a low shear rate of 0.05 sec$^{-1}$ so as to maintain the isolation of the structures; and (c) curing the binder component of the formulation to retain said pattern of isolated structures on said backing.

The viscosity is herein measured using a Bohlin VOR rheometer at the coating temperatures which is typically from about 15° to 50° C. The key is that the formulation must have a reasonably low viscosity at the high shear conditions encountered during filling the rotogravure cells, doctoring the roll to remove excess formulation and deposition from the cells, but after deposition the viscosity needs to be raised sufficiently quickly to prevent flow of the formulation from destroying the isolation of the deposited structures. Isolation is not considered lost if the margins touch in places but only if the structures are in contact with adjacent structures at all points around the margins and the depth of formulation at the contact points is at least 10% of the maximum height of the contacting structures above the backing.

One very suitable way of ensuring the retention of separation is to use a resin formulation that has a thixotropic character, that is to say, which exhibits time dependent shear-thinning behavior. Such formulations rapidly regain their high viscosity when the high shear conditions are removed. Usually within about 30 seconds the viscosity has regained at least 50% of its value under low shear conditions and this is enough in most cases to avoid loss of isolation until the cure process has begun to increase the viscosity.

In a manufacturing facility, the viscosity can more conveniently be measured with a Brookfield viscometer. Thus a preferred process according to the invention comprises:

(a) applying by a rotogravure technique, a layer of a formulation comprising abrasive grits, (and optionally grinding aid, fillers and additives), and a curable resin binder in a pattern of isolated structures, said formulation having a Brookfield viscosity at a spindle speed of 60 rpm of from 50,000 to 1,000 cp., (preferably 25,000 to 2,000 and most preferably from 15,000 to 5,000 cp.);

(b) after deposition on the backing material, increasing the viscosity, at a spindle speed of 6 rpm, of at least the surface layers of the deposited formulation to from 150,000 to 5,000 cp., (preferably 50,000 to 7,000 cp. and most preferably 25,000 to 8,000 cp.); and (c) curing the binder component of the formulation to retain said pattern of isolated structures on said backing.

The viscosity is affected by temperature and the viscosities quoted above are at the temperature at which the formulation is applied in the above process. Typically this is at temperature for example from about 15° to 50° C. The viscosity is measured using a Brookfield viscometer LVF 5X model with a #4 spindle.

It is further desirable that the viscosity recovery time, that is the time for the low viscosity under high shear conditions to revert to the normal high viscosity when the shear conditions are removed, should be relatively short, such as less than 60 seconds and preferably less than 30 seconds.

Any formulation, even a non-thixotropic one, having a low high-shear viscosity in the above range can however be modified upon deposition so as rapidly to adjust the viscosity to the higher low-shear viscosity level described above in such a way as to limit the flow that would tend to occur at the lower viscosities at which the formulation is deposited. It is also not necessary that the viscosity of the whole of the formulation be adjusted to the higher level. It is often sufficient if the outer exposed layer quickly attain the higher viscosity since this acts as a skin so as to retain the shape of the structure even if the inner portion retains the lower viscosity for a longer period.

Viscosity modification of at least the surface layers can be achieved for example by incorporating into the formulation a volatile solvent that is rapidly lost when the formulation is deposited on the backing material, perhaps with the assistance of an increased ambient temperature or by a localized blast of hot gas. Increased temperature of course can also decrease the viscosity. It is therefore important to balance these competing effects to ensure that the result is increasing viscosity. One factor assisting in this direction would be a tendency for increased temperature to cause accelerated curing.

Another option would be rapidly to adjust the temperature of the structure downwards such that the viscosity is increased. This could be done for example by passing the substrate with the structures of deposited formulation thereon over a chilled roll and/or under a cold gas flow.

Besides adjusting the viscosity by change of temperature or removal of liquid, it is possible to adjust the viscosity by increasing the solids content. While this can not be done for the internal portion of the deposited formulation, this is not really necessary. It is sufficient that the surface layer achieve the higher viscosity so as to hold the shape of the deposited pattern. Thus sprinkling a finely divided powder upon the surface of the structure will act to form a localized "skin" of higher viscosity upon the structure causing it to retain its shape until cure renders the shape permanent. The powder itself can be an abrasive, a filler, or a powder material conferring advantageous properties for example a grinding aid such as potassium tetrafluoroborate, an anti-static agent such as graphite, an anti-loading agent such as zinc stearate, a solid lubricant such as wax, or any combination of such materials. This is in fact an advantageous and preferred aspect of the present invention.

The process can also be assisted by providing that the rotogravure roll is heated and the surface on to which the formulation is deposited is cooled. The heating of the rotogravure roll should however not be to such a level that the binder begins to cure and the viscosity is increased as a consequence in the case of thermally curable resin formulations.

DETAILED DESCRIPTION OF THE INVENTION

Figure 1:
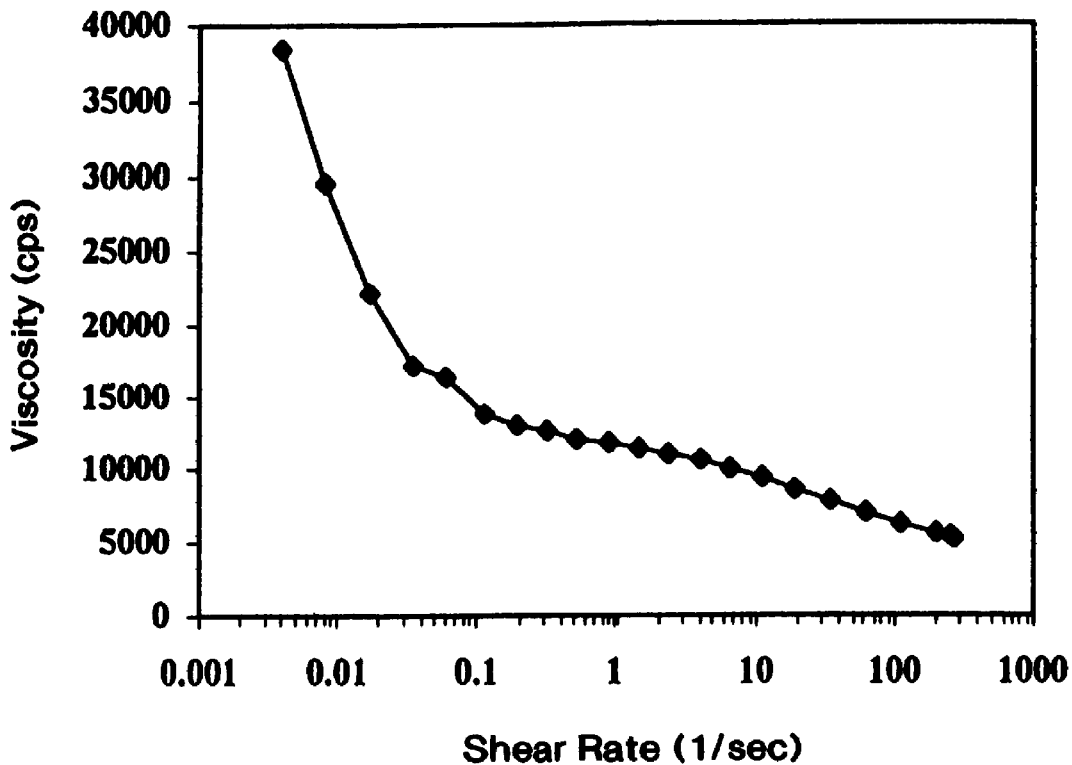
FIG. 1 shows an example of the viscosity variation with respect to shear rate of an abrasive slurry formulation of this invention. As shown, the viscosity variation from high shear to low shear conditions is very marked. Also, as shown in FIG. 2, the recovery of viscosity as the high shear conditions are removed is such that more than 50% of the low shear viscosity is regained once the high shear conditions are removed. With these rheological characteristics, the deposited coating formulations retain the rotogravure pattern with separation between individual depositions.
Figure 2:
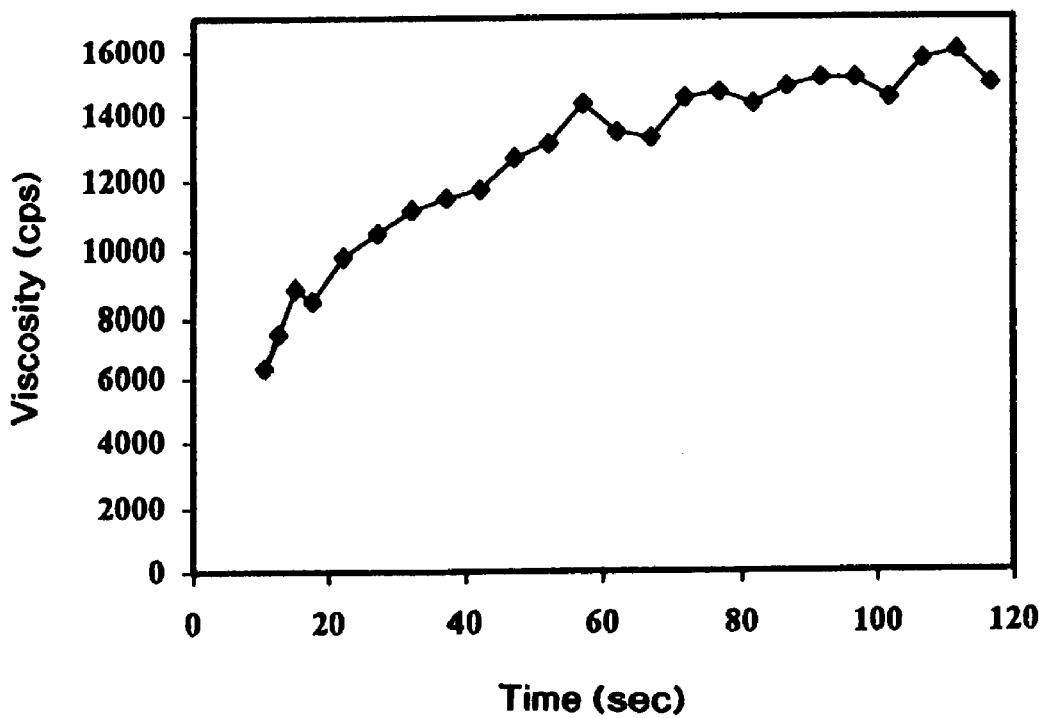
Figure 3:
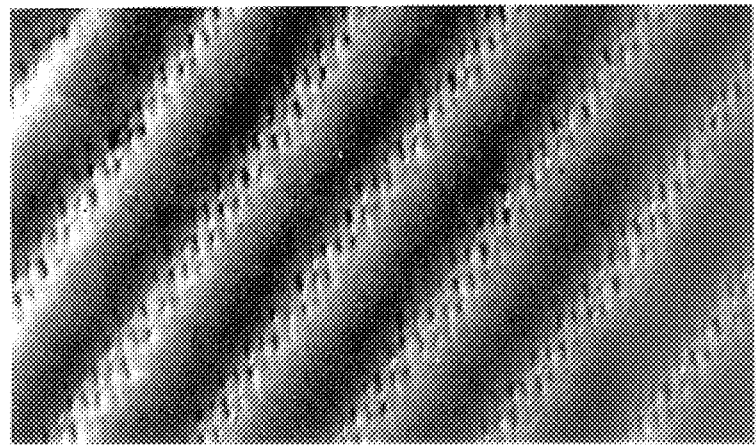
FIG. 3 and 4 illustrate the coated patterns of an abrasive formulation according to this invention that are cured immediately after deposition versus with a 40 minutes delay between deposition and curing. It demonstrates that in contrast to the smeared patterns of comparative examples C and D in U.S. Pat. No. 5,152,917, an abrasive slurry formulation with a properly formulated rheology according to this invention can retain its discrete pattern even up to 40 minutes after deposition before the binder is finally cured and set by UV.
Figure 4:
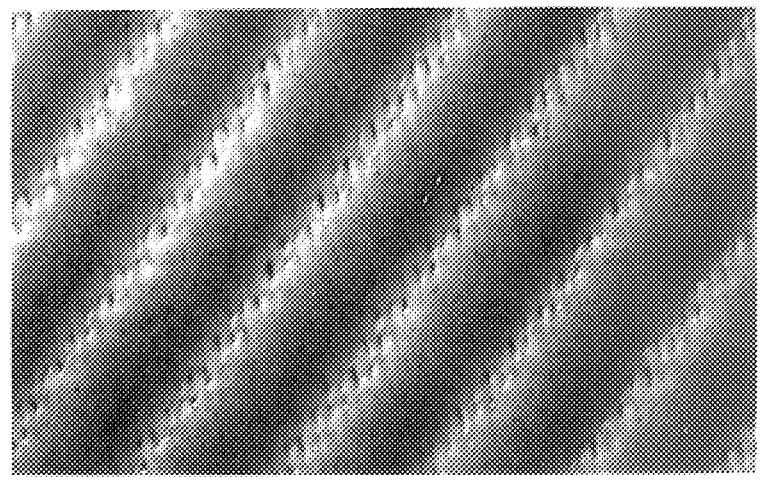

The deposition can be in any desired pattern and this will be determined in large part by the size and distribution of the cells on the rotogravure roll. Generally hexagonal, tetragonal, triangular and quadrangular cross-section cells are quite suitable, though others can also be used. It is for example possible to provide that the cells are in the form of grooves, (for example trihelical grooves), cut in the roll surface. This is often a very advantageous configuration and can be adapted to produce a pattern of diagonal stripes that is at once very distinctive and also very effective for grinding. The number of cells per unit length can also be varied though with a higher cell density the volume of the cells is preferably smaller to maximize separation between the cell contents after deposition on the surface. If the cells are very closely situated, it is possible to cause the deposited formulations to run together by design so as to produce an essentially continuous line.

Other designs, including isolated dots or groups of dots, are also very suitable. The deposited dots themselves tend to be round but the deposition technique, including the speed of the rotogravure roll and the method by which the cells are filled, can cause the shape of the dot deposited to deviate from the round. Thus the dot may have the shape of a crescent or have a "comet tail". In some cases these shapes may have some advantages but in general they are not preferred. It is therefore preferred to adjust the impression pressure and the circumstances under which the rotogravure roll contacts the surface of substrate to which the formulation is to be applied to ensure that discrete round dots of deposited formulation are obtained.

The abrasive component of the formulation can be any of the available materials known in the art such as alpha alumina, (fused or sintered ceramic), silicon carbide, fused alumina/zirconia, cubic boron nitride, diamond and the like as well as the combination of thereof. In the applications for which this type of product is primarily intended, the preferred abrasive is alumina and particularly fused alumina. Abrasive particles useful in the invention typically and preferably have an average particle size from 1 to 150 micron, and more preferably from 1 to 80 micron.

The proportion of abrasive in the formulation is of course determined in part by the viscosity limitations set forth above and the type of application. In general however the amount of abrasive present provides from about 10 to about 90%, and preferably from about 30 to about 80%, of the weight of the formulation.

The other major component of the formulation is the binder. This is a curable resin formulation selected from radiation curable resins, such as those curable using electron beam, UV radiation or visible light, such as acrylated oligomers of acrylated epoxy resins, acrylated urethanes and polyester acrylates and acrylated monomers including monoacrylated, multiacrylated monomers, and thermally curable resins such as phenolic resins, urea/formaldehyde resins and epoxy resins, as well as mixtures of such resins. Indeed it is often convenient to have a radiation curable component present in the formulation that can be cured relatively quickly after the formulation has been deposited so as to add to the stability of the deposited shape as well as a thermally curable resin. In the context of this application it is understood that the term "radiation curable" embraces the use of visible light, ultraviolet (UV) light and electron beam radiation as the agent bringing about the cure. In some cases the thermal cure functions and the radiation cure functions can be provided by different functionalities in the same molecule. This is often a desirable expedient.

The resin binder formulation can also comprise a non-reactive thermoplastic resin which can enhance the self-sharpening characteristics of the deposited abrasive composites by enhancing the erodability. Examples of such thermoplastic resin include polypropylene glycol, polyethylene glycol, and polyoxypropylene-polyoxyethene block copolymer, etc.

Fillers can be incorporated into the abrasive slurry formulation to modify the rheology of formulation and the hardness and toughness of the cured binders. Examples of useful fillers include: metal carbonates such as calcium carbonate, sodium carbonate; silicas such as quartz, glass beads, glass bubbles; silicates such as talc, clays, calcium metasilicate; metal sulfate such as barium sulfate, calcium sulfate, aluminum sulfate; metal oxides such as calcium oxide, aluminum oxide; and aluminum trihydrate.

The abrasive slurry formulation may comprise a grinding aid to increase the grinding efficiency and cut rate. Useful grinding aid can be inorganic based, such as halide salts, for example sodium cryolite, potassium tetrafluoroborate, etc.; or organic based, such as chlorinated waxes, for example polyvinyl chloride. The preferred grinding aids in this formulation are cryolite and potassium tetrafluoroborate with particle size ranging from 1 to 80 micron, and most preferably from 5 to 30 micron. The weight percent of grinding aid ranges from 0 to 50%, and most preferably from 10–30%.

The abrasive slurry formulations in this invention may further comprise additives including: coupling agents, such as silane coupling agents, for example A-174 and A-1100 available from Osi Specialties, Inc., titanate, and zircoaluminates; anti-static agents, such as graphite, carbon black, and the like; suspending agent, such as fumed silica, for example Cab-O-Sil M5, Aerosil 200; anti-loading agents, such as zinc stearate; lubricants, such as wax; wetting agents; dyes; dispersants; and defoamers.

The backing material upon which the formulation is deposited can be a fabric, (woven, non-woven or fleeced), paper, plastic film, metal foil or combination of the thereof. Generally the products made according to the present invention find their greatest utility in producing fine grinding materials and hence a very smooth surface is preferred. Thus finely calendered paper, plastic film or a fabric with a smooth surface coating is usually the preferred substrate for deposition of the composite formulations according to the invention.

The invention will be further described with respect to certain specific embodiments which are understood to be for the purposes of illustration only and imply no necessary limitation on the scope of the invention.

Abbreviations

To simplify the presentation of the data the following abbreviations will be used:

Binder Components

Ebecryl 3600, 3700 Acrylated epoxy oligomers available from UCB Radcure Chemical Corp.
TMPTA trimethylol propane triacrylate available from Sartomer Company, Inc.
HDODA 1,6-hexane diol diacrylate available from Sartomer Co., Inc.
V-PYROL vinyl pyrrolidone available from GAF Corp.
ICTA isocyanurate triacrylate available from Sartomer Co., Inc.
TRPGDA tripropylene glycol diacrylate available from Sartomer Co., Inc.
Kustom KS-201 acrylate monomer gel available from Kustom Service Inc.

Photoinitiators and Additives

Irgacure 651 a photoinitiator available from Ciba-Geigy Company Speedcure ITX 2-isopropylthioxanthone available from Aceto Chemical Corp.
Speedcure EDB ethyl 4-dimethylaminobenzoate available from Aceto Chemical Corp.
KR-55 titanate coupling agent available from Kenrich Petrochemicals
FC-171 fluorocarbon surfactant available from 3M Company
BYK-A510 foam suppressant available from Mallinckrodt Corp.
A-1100 aminopropyl triethoxysilane available from Osi Specialties, Inc.
SOLOX isopropyl alcohol available from EM Science
Dye 9R-75 quinacridone violet UV, a dispersion available from Penn Color.
Pluronic 25R2 polyoxypropylene-polyoxyethylene block copolymer available from BASF Corp.
Cab-O-Sil M5 fumed silica from Cabot Corporation
ATH S3 aluminum trihydrate from Alcoa Grain FU . . . 3 micron fused $Al_2O_3$ from Fujimi.
T . . . FRPL fused $Al_2O_3$ from Treibacher (grade indicated by "P-" Number)
TB . . . BFRPLCC heat treated fused $Al_2O_3$ with ceramic coating from Treibacher (grade indicated by "P-" Number)

Grinding Aid $KBF_4$ . . . Potassium tetrafluoroborate with median particle size of 20 micron available from Solvay, Inc.

Backings

A . . . 3 mil Mylar film for ophthalmic applications
B . . . 5 mil Mylar film for metalworking applications
C . . . J-weight polyester cloth with a surface extrusion coating of 75 micron thickness of Surlyn*.
D . . . J-weight polyester cloth with a surface extrusion coating of 50 micron thickness of Surlyn.
F . . . F755 phenolic finishing J-weight polyester cloth

* Surlyn is an ionomer resin SURLYN 1652-1 from Du Pont.

Formulations:

TABLE 1

| Component | I | II | III | IV | V | VI | VII | VIII |
|---|---|---|---|---|---|---|---|---|
| Ebecryl 3600 | 6.63% | | | | | | | |
| Ebecryl 3700 | | 6.77% | 6.77% | | | 5.30% | | |
| TMPTA | 7.95% | 7.90% | 7.90% | 13.27% | 13.27% | 6.20% | 11.10% | 12.70% |
| HDODA | 3.62% | | | | | | | |
| ICTA | | 7.90% | 7.90% | 13.27% | 13.27% | 6.20% | 11.10% | |
| TRPGDA | | 5.64% | | | | 4.40% | | |
| V-PYROL | 3.59% | | | | | | | 12.70% |
| Kustom KS-201 | | | 5.64% | | | | | |
| Irgacure 651 | 1.04% | 0.90% | 0.90% | 1.15% | 1.15% | 1.10% | 1.10% | 1.00% |
| Speedcure ITX | 0.35% | | | | | | | |
| Speedcure EDB | 0.81% | | | | | | | |
| KR-55 | 0.06% | | | | | | | |
| FC-171 | 0.12% | | | | | | | |
| BYK-A510 | 0.12% | | | | | | | |
| A-1100 | 1.46% | 0.45% | 0.45% | 0.58% | 0.58% | 0.55% | 0.55% | 0.50% |
| Isopropyl Alcohol | | 0.34% | 0.34% | 0.43% | 0.43% | 0.41% | 0.41% | 0.38% |
| Solox | 0.83% | | | | | | | |
| Glacial Acetic Acid | 0.01% | | | | | | | |
| Water | 0.73% | 0.11% | 0.11% | 0.14% | 0.14% | 0.14% | 0.14% | 0.12% |
| Dye 9R-75 | 2.22% | | | | | | | |

TABLE 1-continued

| Component | I | II | III | IV | V | VI | VII | VIII |
|---|---|---|---|---|---|---|---|---|
| Pluronic 25R2 | 1.05% | | | | | 5.60% | 5.60% | |
| Cab-O-Sil M5 | | | | 1.15% | | | | |
| ATH S3 | | | | | 1.15% | | | |
| KBF$_4$ | | 23.33% | 23.33% | 23.33% | 23.33% | 23.33% | 23.33% | 24.20% |
| Grain | 69.41% | 46.67% | 46.67% | 46.67% | 46.67% | 46.67% | 46.67% | 48.40% |

Formulation Preparation Procedure

The monomers and/or oligomer components were mixed together for 5 minutes using a high shear mixer at 1000 rpm. This binder formulation was then mixed with any initiators, wetting agents, defoaming agents, dispersants etc. and mixing was continued for a further 5 minutes at the same rate of stirring. Then the following components were added, slowly and in the indicated order, with five minutes stirring at 1500 rpm between additions: suspension agents, grinding aids, fillers and abrasive grain. After addition of the abrasive grain the speed of stirring was increased to 2,000 rpm and continued for 15 minutes. During this time the temperature was carefully monitored and the stirring rate was reduced to 1,000 rpm if the temperature reached 40.6° C. Thereafter the temperature and the viscosity were recorded.

Gravure Coating Set-up

The coating set-tip included a rubber roll with a Shore A hardness of 75 and a doctor blade set to make an angle with respect to the tangent at the contact point of 55°–75°. A gravure roll rotates in a coating pan to fill the formulation into the cells. The gravure roll bearing the filled cells then passes under the doctor blade to remove excess formulation and thereafter into contact with the substrate as it passes under the rubber roll which acts to draw the formulation from the cells and deposit it upon the backing material.

Cure

After the pattern is deposited upon the substrate the patterned substrate passes to a cure station. Where the cure is thermal, appropriate means are provided. Where the cure is activated by photoinitiators a light source may be provided. If UV cure is employed, two 300 watt sources are used: a D bulb and an H bulb with the dosage controlled by the rate at which the patterned substrate passed under the sources.

The patterns coated and the relevant viscosities are shown in the following Tables 2 and 3. "HEX" indicates hexagonal cells; "QUAD" indicates square cells; and "TH" indicates trihelical line patterns. The hexagonal raised ridge patterns are typical of those according to the prior art patent U.S. Pat. No. 5,014,468. "Discrete Δ dots" indicates that the discrete dots were triangular. Note that all examples with the viscosity within the range set forth before all exhibited a discrete pattern with separation between individual depositions.

TABLE 2

| GRAV.PATT. | LINES/INCH | RESIN FORM. | GRAIN, SIZE | COATING PATTERN | EX. |
|---|---|---|---|---|---|
| HEX | 85 | I | FU | Hexagonal raised ridges | 1 |
| HEX | 50 | I | FU | Hexagonal raised ridges | 2 |
| HEX | 28 | I | T, P400 | Hexagonal raised ridges | 3 |
| HEX | 28 | I | T, P1200 | Hexagonal raised ridges | 4 |
| HEX | 17 | I | FU | Discrete dots | 5 |
| HEX | 17 | V | T, P400 | Hexagonal raised ridges | 6 |
| HEX | 17 | V | T, P240 | Connected dots | 7 |
| HEX | 17 | V | T, P180 | Connected dots | 8 |
| TH | 25 | I | T, P400 | Discrete lines | 9 |
| TH | 10 | IV | T, P180 | Discrete lines | 10 |
| TH | 10 | IV | T, P400 | Discrete lines | 11 |
| TH | 10 | II | T, P180 | Discrete lines | 12 |
| TH | 10 | II | T, P320 | Discrete lines | 13 |
| TH | 10 | II | TB, P320 | Discrete lines | 14 |
| TH | 10 | III | T, P180 | Discrete lines | 15 |
| TH | 10 | III | T, P320 | Discrete lines | 16 |
| QUAD | 10 | I | FU | Discrete dots | 17 |
| QUAD | 10 | I | T, P1200 | Discrete Δ dots | 18 |
| QUAD | 10 | I | T, P400 | Discrete Δ dots | 19 |
| QUAD | 10 | II | T, P180 | Discrete Δ dots | 20 |
| QUAD | 10 | II | T, P320 | Discrete Δ dots | 21 |
| QUAD | 10 | III | T, P180 | Discrete Δ dots | 22 |
| QUAD | 10 | III | T, P320 | Discrete Δ dots | 23 |
| TH | 10 | VI | T, P320 | Discrete lines | 24 |
| TH | 10 | VII | T, P320 | Discrete lines | 25 |
| TH | 10 | V | T, P320 | Discrete lines | 26 |
| TH | 10 | VIII | T, P320 | Loss of Separation* | 27* |

TABLE 3

| Bohlin VOR VISC. @ 0.05 SEC$^{-1}$ | Bohlin VORVISC. @ 10$^3$ SEC$^{-1}$ | Brookfield VISC. @ 6 RPM (cps) | Brookfield VISC. @ 60 RPM (cps) | EX. |
|---|---|---|---|---|
| 15,000 | 5,000 | 8,000 | 9,900 | 1 |
| 15,000 | 5,000 | 8,000 | 9,900 | 2 |
| 49,000 | 1,500 | 13,000 | 5,300 | 3 |
| 21,000 | 2,000 | 23,500 | 9,600 | 4 |
| 15,000 | 5,000 | 8,000 | 9,900 | 5 |
| 18,000 | 6,000 | 20,500 | 11,500 | 6 |
| 6,800 | 3,400 | 10,000 | 6,100 | 7 |
| 4,000 | 2,500 | 8,000 | 4,800 | 8 |
| 49,000 | 1,500 | 13,000 | 5,300 | 9 |
| 4,000 | 2,500 | 8,000 | 4,800 | 10 |
| 18,000 | 6,000 | 20,500 | 11,500 | 11 |
| 9,000 | 3,000 | 8,500 | 4,400 | 12 |
| 8,600 | 4,200 | 14,000 | 8,000 | 13 |
| 8,700 | 4,100 | 13,000 | 8,100 | 14 |
| 8,900 | 3,200 | 8,000 | 4,600 | 15 |
| 10,000 | 4,900 | 13,500 | 8,500 | 16 |
| 15,000 | 5,000 | 8,000 | 9,900 | 17 |
| 21,000 | 2,000 | 23,500 | 9,600 | 18 |
| 49,000 | 1,500 | 13,000 | 5,300 | 19 |
| 9,000 | 3,000 | 8,500 | 6,500 | 20 |
| 8,600 | 4,200 | 14,000 | 8,000 | 21 |
| 8,900 | 3,200 | 8,000 | 4,600 | 22 |
| 10,000 | 4,900 | 13,500 | 8,500 | 23 |
| 750 | 225 | 700 | 465 | 27* |

The 17 HEX hexagonal gravure pattern comprised cells 559 microns in depth with equal sides of 1000 microns at the top and 100 microns at the bottom.

The 10 TH trihelical pattern comprised continuous channel cut at 45° to the roll axis that has a depth of 699 microns and a top opening width of 2500 microns.

The 10 QUAD quadrangular pattern comprised a square cells with a depth of 420 microns, a top side dimension of 2340 microns and a bottom side dimension of 650 microns.

It was found that, where the gravure roll deposits "dots", the shape of the dots can be influenced by the rotational speed of the gravure roll and the pressure exerted by the rubber roll. Too high a speed or too high a pressure between the rubber roll and the gravure roll tends to distort the shape away from the round towards the triangular and may even lead to adjacent dots being connected. However under ideal conditions, which will vary according to the formulation, the rubber roll hardness and pressure upon the gravure roll, the gravure pattern and the rate of deposition, the ideal "dot" pattern is round.

Cure was initiated using UV radiation within about 30 seconds of deposition of the formulations.

The Examples described above were subjected to grinding tests using a modified 121 Fss Ring Test procedure. In each case a 6.4 cm×152.4 cm belt was used and the belt was moved at a rate of 1524 smpm. The belt was contacted with a 304 stainless steel ring workpiece, (17.8 cm O.D., 15.2 cm I.D., and 3.1 cm width), at a pressure of 10 psi (69 KN/m$^2$). The contact wheel behind the belt was a 7 inch (17.8 cm) plain face rubber wheel with 60 durometer hardness. The workpiece was moved at a speed of 3 smpm.

Ten rings were pre-roughened to an initial Ra of 50. The grinding intervals of one minute were followed by measurements of cut amount, workpiece temperature and surface finish. With the ten rings a total of 10 minutes grinding was performed with each belt and the total cut and the average surface finish Ra, Rtm, and temperature of workpiece were reported. Ra is the arithmetic mean of deviation of the roughness profile from the mean line and Rtm is the weighted average of the deepest scratches. Both Ra and Rtm values are in units of micro inches. The results are shown in Table 4. Comparative example C-1 uses a commercial fine abrasive product available from Norton Company under the designation R245 with P-400 fused alumina abrasive grits. R245 does not bear a patterned surface.

TABLE 4

| EX. | Coating Pattern | BACKING | CUT (gm) | TEMP° C. | Ra | Rtm |
|---|---|---|---|---|---|---|
| C-1 | None | F | 24 | 69 | 16 | 225 |
| 11 | 10 TH | B | 65.6 | 58 | 23 | 231 |
| 6 | 17 HEX | C | 40.6 | 57 | 34 | 311 |

The pattern coated samples give a much higher total Cut whereas offer a cool cutting than the conventional coated abrasive R245.

The second set of examples followed the same testing procedure except that the rings were pre-roughened to an initial Ra of 70. The results are shown in Table 5. Comparative example C-2 uses a commercial fine abrasive product available from Norton Company under the designation R245 with P-320 fused alumina abrasive grits. R245 does not bear a patterned surface.

TABLE 5

| EX. | Coating Pattern | BACKING | CUT (gm) | TEMP° C. | Ra | Rtm |
|---|---|---|---|---|---|---|
| C-1 | None | F | 43.924 | 60 | 24 | 259 |
| 13 | 10 TH | B | 64.2 | 57 | 29 | 274 |
| 13 | 10 TH | C | 70.4 | 57 | 32 | 344 |
| 13 | 10 TH | F | 61.9 | 54 | 30 | 273 |
| 21 | 10 Q | B | 59 | 58 | 35 | 256 |
| 21 | 10 Q | C | 53.3 | 62 | 31 | 277 |
| 21 | 10 Q | F | 48.6 | 61.5 | 32 | 250 |

Again, both the 10Q and 10TH patterned abrasives on various different backings outperform the conventional none patterned coated abrasives in total cut and cooler cutting while providing acceptable surface finishes.

In the following series of tests the same test procedure was used as is described above with the difference that 20 rings were pre-roughened to an initial Ra of 70 and a total of 20 minutes grinding time was performed on each belt. The initial cut after the first minute of grinding was also reported. The results are set forth in Table 6.

TABLE 6

| EX. | BACKING | INITIAL CUT (gm) | TOTAL CUT (gm) | TEMP° C. | Ra | Rtm |
|---|---|---|---|---|---|---|
| C-2 | F | 9.2 | 55.4 | 54 | 17 | 126 |
| 13 | C | 4.1 | 85.5 | 48 | 25 | 166 |
| 13-a | C | 7.3 | 77.7 | 47 | 22 | 155 |
| 13-b | C | 2.7 | 35 | 46.5 | 20 | 138 |
| 16 | C | 1.1 | 77.6 | 49 | 18 | 130 |

Example 13-a indicates that the belt was the same as used in Example 13 except that the belt was pre-dressed before use. This clearly improved the initial cut (after the first minute of grinding) and the smoothness of the surface but cost somewhat in the total cut obtained. Example 13-b shows the effect of omitting the grinding aid component ($KBF_4$) from the formulation, i.e., with 70% by weight of P320 aluminum oxide grain (T) and without any $KBF_4$ in slurry. The initial cut of Example 13-b remained low even after pre-dressing step before test. Example 16 shows a lower initial and total cut but a finer surface finish can be obtained with a different resin formulation.

In the following set of grinding examples, the effect of additional coating of powder material on to the patterned coated abrasive slurry is demonstrated. The same test procedure as described above was followed with 20 rings pre-roughened to an initial Ra of 80. The Ra and Rtm values were measured only after the first minute, the 10th minute and the 20th minute interval of grinding. The Ra and Rtm reported are the average of these three readings. The initial cut after the first minute of grinding was also reported. The results are shown in Table 7.

TABLE 7

| EX. | BACKING | INITIAL CUT (gm) | TOTAL CUT (gm) | TEMP° C. | Ra | Rtm |
|---|---|---|---|---|---|---|
| C-2 | F | 7.3 | 52.7 | 60 | 19 | 159 |
| 14 | C | 4.5 | 89.8 | 50.6 | 26 | 252 |
| 14-a | C | 7.6 | 64.0 | 52.7 | 21 | 212 |
| 14-b | C | 9.9 | 83.7 | 50.4 | 22 | 228 |

Example 14 shows that the 10 trihelical patterned abrasive with an slurry formulation using heat treated aluminum oxide grains (BFRPLCC) and $KBF_4$ grinding aid exhibited a much higher total cut and cool cutting than comparative example C-2. Example 14-a is the same as Example 14 except that an additional layer of BFRPLCC abrasive grains was coated onto the patterned abrasive slurry then followed by UV curing. This improves the initial cut (after one minute of grinding) and surface finish but decreases the total cut. This compromise between the initial cut and total cut can be eliminated if a powder blend of BFRPLCC grains and $KBF_4$ grinding aid instead of just grains was coated onto the surface of patterned abrasive slurry then followed by UV curing. As shown in Example 14-b, an additional powder coating of the grain/grinding aid blend (2 to 1 ratio by weight) significantly improved the initial cut whereas maintained the total cut and a finer surface finish. This approach is in fact a preferred aspect of this invention. The following set of examples shows how the addition of a non-reactive thermoplastic polymer affects the grinding performance of patterned abrasives. Example 13-c in Table 8 is the same as Example 13 in Table 6 except that an additional powder coating of FRPL/$KBF_4$ blend (2:1 weight ratio) was applied onto the surface of abrasive slurry. Note that with everything else being equal, the addition of Pluronic 25R2, a non-reactive polyoxypropylene-polyoxyethylene block copolymer, significantly improves the total cut (Example 25 versus Example 26 and Example 24 versus Example 13-c) in both cases with and without additional surface powder coating.

TABLE 8

| EX. | RE-SIN | PLURONIC 25R2 | FRPL/$KBF_4$ SURFACE POWDER | BACK-ING | INITIAL CUT (gm) | TOTAL CUT (gm) |
|---|---|---|---|---|---|---|
| 26 | V | No | No | D | 1.9 | 44.8 |
| 25 | VII | Yes | No | D | 3.9 | 82.5 |
| 13-c | II | No | Yes | C | 8.6 | 90.9 |
| 24 | VI | Yes | Yes | C | 7.9 | 102.5 |

In a further set of experiments evaluating the grinding efficiency of the products according to the invention, certain of the products were tested on a Coburn Model 5000 machine which is designed to carry out Coburn Ophthalmic Testing procedure I (505 Tpw-2FM). The test involved polishing a CR-39 plastic lens having a 6.4 cm diameter and a thickness of 317.5 cm. The lens is oscillated at 1725 rpm and the abrasive-bearing sheet, which has a 5 mil Mylar backing, is set to oscillate while contacting the surface of the lens under an applied pressure of 20 psi (138 $KN/m^2$). The lens had received a first fining treatment and the application tested in the series of comparisons was a second fining operation.

In the results displayed in Table 9, the grinding was continuous for 2 minutes. In Table 10, data were obtained after repeated grinding intervals of 30 seconds and the cumulative cut after 1, 5 and 10 minutes is reported.

TABLE 9

| EX. | PATTERN | GRAV.ROLL | CUT (mils) | Ra |
|---|---|---|---|---|
| C-3 | Hexagonal raised ridges | 85 HEX | 34 | 3 |
| C-4 | Smooth | N/A | 2 | 10 |
| 2 | Hexagonal raised ridges | 50 HEX | 19 | 4 |
| 5 | Discrete Dots | 17 HEX | 51 | 6 |
| 17 | Discrete Dots | 10 Q | 116 | 8 |

TABLE 10

| EX | GRAV. ROLL | COATING PATTERN | 1 min. Cut (mils) | 5 min. Cut (mils) | 10 min. Cut (mils) | Ave. Ra |
|---|---|---|---|---|---|---|
| C-3 | 85 HEX | Hexagonal raised ridges | 15 | 36 | 37 | 6 |
| 5 | 17 HEX | Discrete Dots | 27 | 116 | 174 | 11 |
| 17 | 10 Q | Discrete Dots | 55 | 217 | 341 | 11 |

From the above data in Table 9, it can be seen that a smooth coating without the gravure pattern shows poor cut and surface finish. It is also clear that the frequency and type of pattern is important. C-3 is a successful commercial product available from Norton Co. under the designation Q-135. However it is comfortably outperformed by the products bearing patterns of discrete dots.

The latter point is made again in Table 10 which shows that the discrete dot pattern continues to grind effectively long after the hexagonal raised ridge patterned product has ceased to be effective.

All the formulations in the above two tables used the same resin formulation and the same 3 micron sized abrasive grits.

What is claimed is:

1. A process for the production of a coated abrasive comprising a pattern of abrasive/binder composites adhered to a backing material said process comprising:
   (a) applying by a rotogravure technique, a layer of a formulation comprising a mixture of abrasive grits and a curable resin binder in a pattern of isolated structures, said formulation having a viscosity at a shear rate of $10^3$ sec$^{-1}$ of from 10,000 to 1,000 cp.;
   (b) after deposition of the formulation on the backing material, increasing the viscosity of at least the surface layers of the deposited formulation so as to maintain the isolation of the structures; and
   (c) curing the binder component of the formulation to retain said pattern of isolated structures on said backing.

2. A process for the production of a coated abrasive comprising a pattern of abrasive/binder composites adhered to a backing material said process comprising:
   (a) applying by a rotogravure technique, a layer of a formulation comprising abrasive grits and a curable resin binder in a pattern of isolated structures, said formulation having a Brookfield viscosity at a spindle speed of 60 rpm of from 50,000 to 1,000 cp.;
   (b) after deposition on the backing material, increasing the viscosity, at a spindle speed of 6 rpms of at least the surface layers of the deposited formulation to from 150,000 to 5,000 cp.; and
   (c) curing the binder component of the formulation to retain said pattern of isolated structures on said backing.

3. A process according to claim 1 in which the viscosity of the formulation after deposition is increased by initiation of the cure process before the separation of the structures has been lost.

4. A process according to claim 1 in which the formulation is thixotropic in nature and has a viscosity at a shear rate of 0.05 sec$^{-1}$ of at least 4,000 cps.

5. A process according to claim 1 in which the viscosity of the deposited formulation is adjusted, at least in part, by a change of the temperature.

6. A process according to claim 1 in which the formulation comprises a volatile component and the viscosity of the deposited formulation is adjusted, at least in part, by removal of at least a portion of the volatile component from the formulation.

7. A process according to claim 1 in which the viscosity of the finely divided deposited formulation is adjusted, at least in part, by addition of a powder to the surface of the deposited structures.

8. A process according to claim 7 in which the finely divided powder is selected from the group consisting of abrasive grits, grinding aids, inert fillers, anti-static agents, lubricants, anti-loading agents and mixtures thereof.

9. A process according to claim 8 in which the powder is an abrasive grit selected from the group consisting of alumina, fused alumina/zirconia, silicon carbide, cubic boron nitrite, diamond and mixtures thereof.

10. A process according to claim 8 in which the powder is a grinding aid selected from the group consisting of cryolite, potassium tetrafluoroborate and mixtures thereof.

11. A process according to claim 1 in which the abrasive grit is selected from the group consisting of alumina, fused alumina/zirconia, silicon carbide, cubic boron nitrite, diamond and mixtures thereof.

12. A process according to claim 1 in which the formulation also comprises one or more additives selected from the group consisting of, grinding aids, inert fillers, anti-static agents, lubricants, anti-loading agents and mixtures thereof.

13. A process according to claim 12 in which the formulation comprises a grinding aid selected from the group consisting of cryolite, potassium tetrafluoroborate and mixtures thereof.

14. A process according to claim 1 in which the binder resin comprises a thermally curable component.

15. A process according to claim 1 in which the binder resin comprises a UV-curable component.

16. A process according to claim 1 in which the binder resin comprises a non-reactive thermoplastic component.

17. A process according to claim 1 in which the formulation is laid down in a pattern that is selected from discrete dots and discrete lines.

18. A coated abrasive made by a process as described in claim 1.

19. A coated abrasive made by a process according to claim 8.

20. A coated abrasive made by a process according to claim 12.

21. A coated abrasive made by a process according to claim 17.

* * * * *